June 11, 1940. D. D. BURCH 2,203,718
PROCESS AND APPARATUS FOR TREATING LIQUIDS
Filed Dec. 14, 1936 3 Sheets-Sheet 1
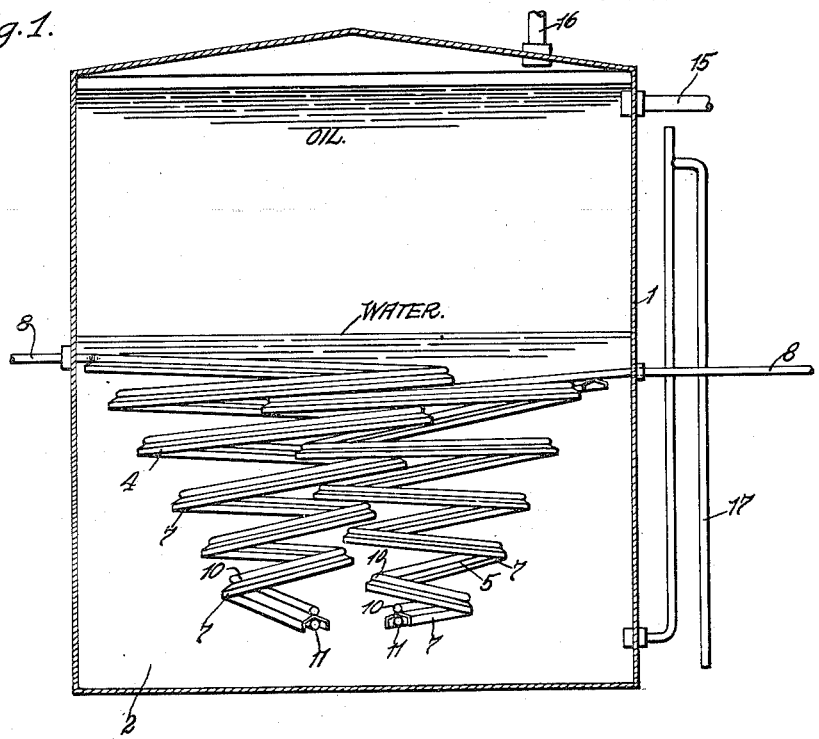
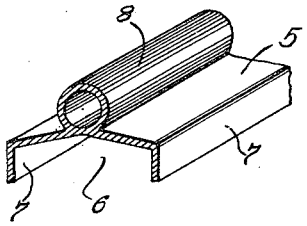
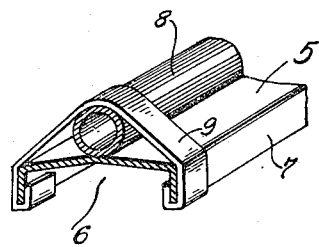
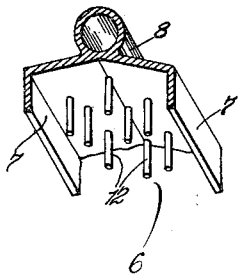
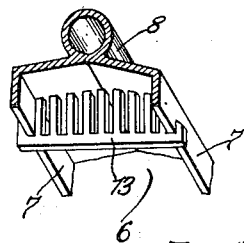
Inventor
Donald D. Burch June 11, 1940. D. D. BURCH 2,203,718
PROCESS AND APPARATUS FOR TREATING LIQUIDS
Filed Dec. 14, 1936 3 Sheets-Sheet 2

Inventor
Donald D. Burch
By Bruninga & Sutherland,
His Attorneys.

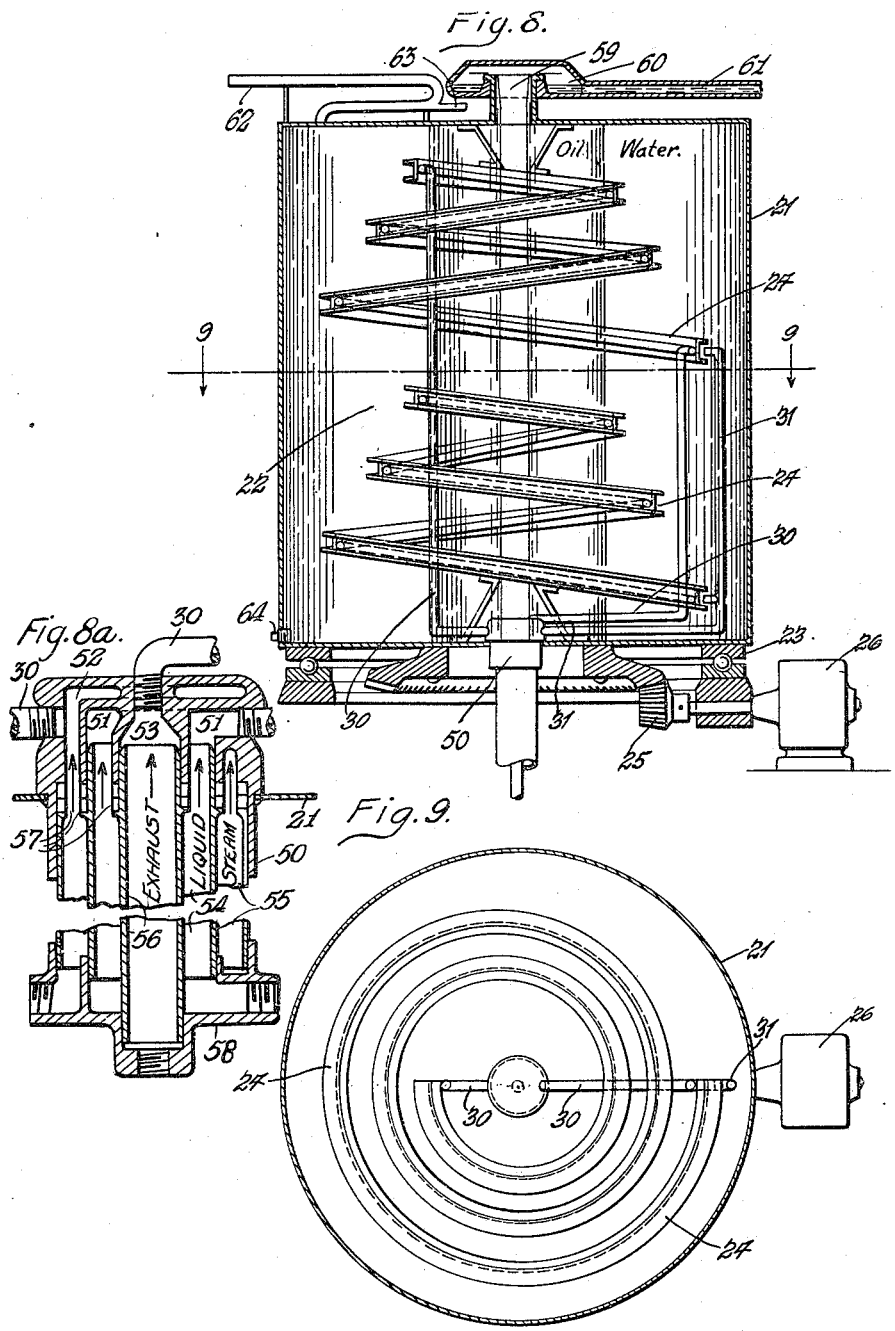

Patented June 11, 1940

2,203,718

UNITED STATES PATENT OFFICE 2,203,718

PROCESS AND APPARATUS FOR TREATING LIQUIDS

Donald D. Burch, Tulsa, Okla.

Application December 14, 1936, Serial No. 115,792

14 Claims. (Cl. 210—47)

This invention pertains to a process and apparatus for treating liquids and more particularly for treating mixtures of immiscible liquids such as emulsions. A practical application of the invention is the dehydrating of crude oil which is usually obtained in the form of an emulsion of water in oil.

In accordance with this invention the emulsion is broken by separating the ingredients such as water and oil from each other under the action of a separating force such as gravity. Simple settling operations have been used heretofore for separating water from oil, but these have been of the very simplest kind, consisting merely of allowing the mixture to rise in a settling tank while the water separates out as best it may and sinks to the bottom of the tank while the oil rises above the water. Such processes have often been very inefficient and it has been necessary in many cases to reprocess the finished product of such an operation in order to reduce the water content to the desired value.

In the processes heretofore practiced it has been customary to carry out the separation of the ingredients in a tank in which the heating means is located in the bottom of the tank and at a substantially uniform level. Such an arrangement has some serious disadvantages. The application of heat to the liquid bath at the bottom thereof tends to agitate the liquid, usually by setting up convection currents. In this manner rising currents are often established at points at which a separated ingredient such as water should have an opportunity to descend. Accordingly, the orderly movement of the separated ingredient is interfered with and the separation itself may accordingly be retarded.

Another disadvantage of such an arrangement is that the heating unit at the bottom of the tank soon becomes covered with solid sediment. The action of the heat tends to pack this sediment to a more or less solid mass. This of course reduces the efficiency of the heating unit and renders it difficult to clean the tank.

In accordance with this invention on the other hand the heating unit is so arranged that the fluid under treatment is constantly moved directly in contact therewith. Furthermore, the unit is above the liquid under treatment so that contact is maintained and the water separating out may descend immediately without encountering interfering currents.

In accordance with the present invention the original liquid or mixture to be treated is passed through a liquid bath under the operation of a separating force such as gravity, the two liquid constituents being of different densities, and the movement of the mixture through such bath is so regulated as to retain the mixture under the action of the separating force for a greatly extended time. Furthermore such conditions of operation are established that immediately upon the separation of an ingredient from the original liquid said ingredient may move away from the liquid to a remote portion of the bath usually the bottom of the tank. As a result of this procedure the ingredient which is separated from the original liquid immediately leaves it and moves away so that the action of the bath may immediately be applied to the remaining liquid in order to accomplish a further refinement thereof. By thus immediately removing the separated ingredient and greatly extending the time of action of the bath and the separating force, the latter period of the process is utilized to operate upon an original liquid which has already been refined to a considerable extent, so that the further action of the process is effective to separate those portions of the separable ingredients which are more intimately locked up in the liquid being refined. Accordingly the process tends to reach and acts upon these intimately associated portions, which portions were not reached at all by prior processes.

In the application of this invention to the dehydrating of oil the original liquid or mixture of oil and water is passed through a bath of water in a suitable dehydrating tank. The mixture is preferably heated during its entire progress through the bath. Arrangements are such that the mixture travels slowly through the heated water bath so that the water may be separated therefrom by the action of the separating force. The mechanical arrangements are such that the water which separates out is free to move under the action of the separating force so that it leaves the vicinity of the mixture and passes to another portion of the tank. If the mixture is in the form of an emulsion, an emulsion breaking reagent may be applied to the mixture either before or during the process. The travel of the mixture is guided through the bath in such a manner that the distance of such travel within the water bath is also the time during which the process is active may be increased fifty fold over the time and distance involved in prior settling operations.

It is an object of this invention therefore to provide an improved process for treating liquids, more particularly to separate certain ingredients or impurities therefrom in which the action of the separating force may be greatly enhanced.

Further objects will appear from the following description taken in connection with the accompanying drawings in which:

Figure 1 is a vertical sectional view of an apparatus embodying this invention and adapted for carrying out the process thereof.

Figure 4 is a detail of the guiding tracks somewhat enlarged.

Figure 5 is a view similar to Figure 4 showing a modified construction.

Figures 6 and 7 are enlarged perspective details of portions of the guiding track illustrating arrangements of baffles.

Figure 8 is a vertical section illustrating another embodiment of this invention, and Figure 8a is an enlarged sectional detail of Figure 8 showing the inlet connection for the various fluids.

Figure 9 is a section on line 9—9 of Figure 8.

Figure 2:
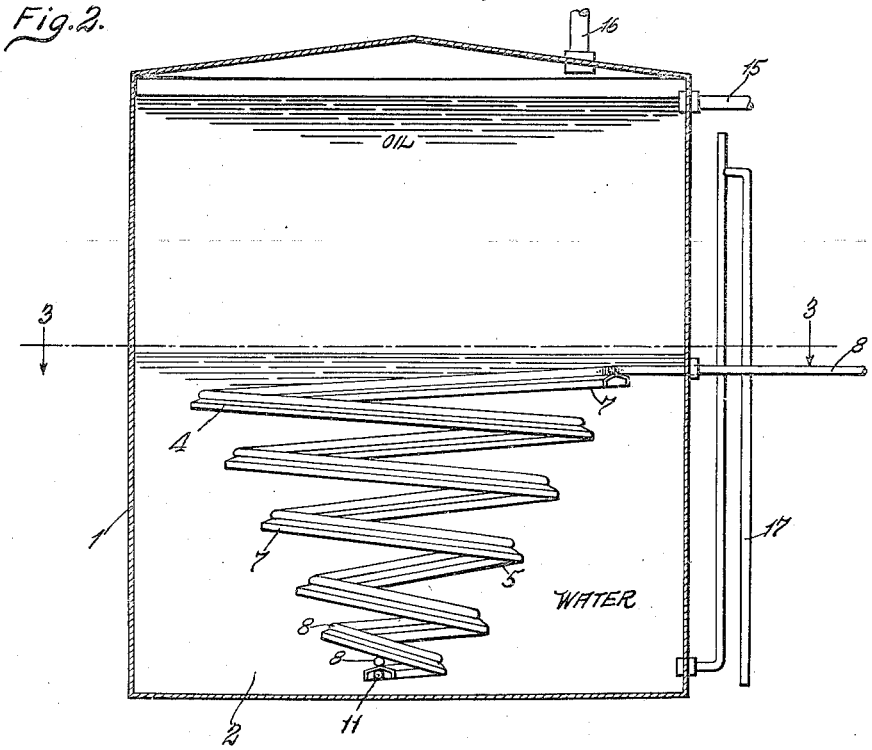
Figure 2 is a view similar to Figure 1 illustrating another embodiment of this invention.

Referring now to the drawings, 1 designates a deep tank of any suitable nature adapted to contain a bath 2 of water or other suitable liquid. Mounted on suitable support, not shown, within the tank 1 are one or more guiding tracks 4.

These tracks may be constructed as illustrated in Figures 4 and 5. The track is preferably constructed in the form shown having sloping roof portions 5 providing therebelow an inverted trough 6 and side wall portions 7. Above the roof portion 5 and in contact therewith is a steam pipe 8 adapted to receive a heating fluid such as steam. The pipe 8 may be made integral with the roof portion 5 as shown in Figure 4 or separate therefrom and attached thereto by suitable fasteners 9 as shown in Figure 5. It will be understood, of course, that any other suitable type of heating means may be employed, such as hot water, hot air, electricity, as by replacing the heating pipe 8 with a resistance wire or coil, or any other suitable heating means.

Figure 1 shows two such tracks each in the form of a conical helix arranged with its small end down. While Figure 1 shows two such helixes, only one may be used under certain circumstances as will be pointed out later.

It will be noted that the arrangement of each helix 4 is such that if a light liquid adapted to float upon the bath 2 should be confined in the trough 6 thereof, its tendency to rise in the bath will cause it to travel upwardly along the track, following the helix. It will be clear that by thus causing a liquid to follow the path of the helix its progress may be made relatively slow while at the same time the distance of its travel is greatly extended as compared to the depth of the bath 2. Such slow travel along a greatly extended path causes the liquid to remain under the influence of the bath 2 for a greatly extended period of time.

Figure 3:
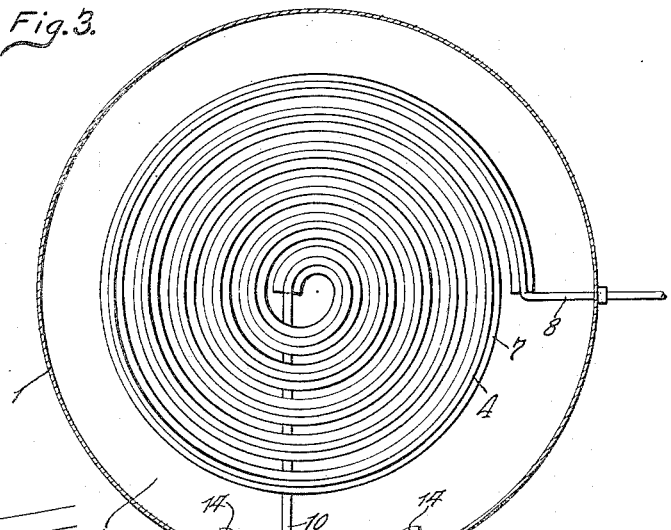
Figure 3 is a sectional view on line 3—3 of Figure 2.
Figure 1A:
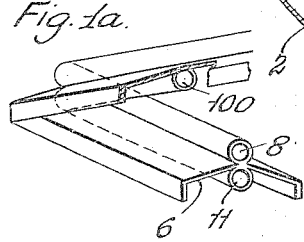
Figure 1a is an enlarged detail of Figure 1 with parts in section.

Pipe connections 10 extend into the tank and connect with the pipes 8 so as to supply a heating fluid such as steam thereto. Just below the pipe 10 similar connections 11 are arranged to lead the fluid to be treated into the tank. The pipes 11 are preferably arranged to travel along with the heating pipes 10, preferably in contact therewith, for a considerable distance before or after entering the tank, or both, so that the liquid to be treated may be thoroughly heated at the beginning of its treatment. After having been thus heated the liquid is discharged from the pipe 11 underneath the guiding track 4. When the liquid has thus been delivered to the bath 2 it begins its upward travel along the guide 4. In Figure 3 the pipe 11, being below the pipe 10, may be seen only beyond the elbow outside the tank. As shown in Figure 1a, the inlet pipe 11 may follow the trough 6 for a certain distance and then terminate, as indicated at 100, so as to deliver the liquid into the trough.

During this travel of the liquid the separating force, in the present case gravity, is continually active to separate the ingredients of the mixture in accordance with their densities. Accordingly, in treating an oil emulsion the water tends to separate from the oil and being heavier tends to sink to the bottom of the tank. It will be noted that the guide 4 is entirely open and unobstructed underneath so that as soon as the water frees itself from the mixture it may immediately move away from that mixture by sinking downwardly in the tank. A conical arrangement of the track 4 provides that each successive turn thereof extends beyond the turn below it so as to leave a clear drop for the separated water which may pass straight to the bottom of the tank without obstruction by any lower portion of the track.

In the operation of this device, the liquid to be treated enters by the pipes 11. As pointed out above, these pipes enter the tank along with the pipes 10. In Figure 3, the pipe 11 would not be seen as it is positioned below the pipe 10 in that view. As the pipes 10 and 11 travel together for a distance before entering the tank, the liquid is pre-heated to a certain extent during this travel. The pipes 11 terminate after entering the trough 6 and the liquid is, therefore, delivered within this trough so as to flow through the tank under the guidance of said trough. The flow through the tank is promoted by the buoyancy of the mixture in the water and the upward slope of the spiral track 4. The heating pipes 10 running along said track continually supply heat to the mixture as it travels. This causes expansion of the liquid and facilitates the separation of water from the mixture. As the water separates out it tends to sink in the bath. It will be noted that in view of the spiral form of the track 4, it progresses upwardly in successive tiers and each tier is unmasked by the preceding one so that there is nothing below it to obstruct a free movement of the water downwardly with respect to the oil of the mixture. By the time the mixture reaches the top of the spiral track 4, substantially all of the water has been separated therefrom and it now consists of substantially pure oil, and it may be discharged from the upper end of the trough 6 and then passes upwardly to the top of the tank where the clean oil accumulates and may be drawn off by the conduit 15 as desired.

It will be noted that of the two tracks 4 one forms a right handed and the other a left handed helix. That is, as seen from the top, the direction of rotation of the liquid passing upwardly along one helix is clockwise and the other counterclockwise. The purpose of this arrangement is as follows: When only a single track is used instead of two as in Figure 1, the continual although slow movement of the liquid along the track tends to carry with it the adjacent liquid of the bath 2. As this motion continues there is a tendency gradually to set the entire body of liquid of the bath 2 into rotation in the tank 1. By providing two tracks as in Figure 1 having opposite rotation this tendency to set the liquid of the bath itself into rotation is counteracted.

In order to insure a more complete separating action on the liquid under treatment provision is made for subdividing or breaking up the smooth flow so as to gently agitate the flowing stream of liquid as it passes along the track 4. This may be accomplished by means of baffles or obstructions placed in the path of the flowing liquid as illustrated in Figures 6 and 7. In Figure 6 a series of downwardly extending pins 12 formed on or secured in any suitable manner to the under side of the track 4 within the trough 6, serve to divide and break up the stream. Any other suitable means for breaking up the stream may be provided such for instance as vanes or baffles mounted in any desired way in the trough 6 so as to cause a certain agitation of the flowing with liquid in order to break it up. In Figure 7 a comb 13 is shown attached to the trough with its teeth extending upwardly thereinto so as to divide the stream into small filaments. By such subdivision a thorough washing of the liquid under treatment in the bath 2 may be accomplished. These baffles are placed, of course, only in the portion of the trough 6 beyond the outlet of the pipe 11.

In the embodiment shown in Figure 2 only a single helix is provided. In such an embodiment it is sometimes advantageous to take advantage of the rotation of the liquid of the bath as mentioned above, sometimes called "rolling," in order to assist in controlling the operation of the process. For instances in cases where the baffles or obstructions 12 and 13 are so arranged as unduly to obstruct the progress of the liquid, the entire body of liquid in the bath may be set into rotation on purpose in the same direction as the liquid under treatment tends to travel along the track. Such rotation of the main body of liquid then assists to maintain the flow of the liquid under treatment along the track. Similarly in such instances where the flow along the track would be too rapid the liquid of the bath 2 may be put into rotation in the opposite direction so as to counteract such flow and slow it down to a proper value. In this way the liquid of the bath may be given a movement of its own by which the flow of the liquid under treatment may be controlled.

In order to set up such a rotation of the liquid of the bath 2, jets 14 may be provided in the tank 1, directed tangentially thereof, by means of which water, steam or any other fluid may be injected tangentially into the tank so that by its action such rotation or rolling may be set up. Two jets may be provided one facing in each direction so that by using one or the other a rotation of the bath either clockwise or counterclockwise may be set up. It will be understood, of course, that any greater number of jets may be employed, if desired, in accordance with the nature or magnitude of the effect required.

In carrying out this process with the apparatus shown in Figures 1 and 2 the separating force involved is the force of gravity. However, other forces may be used for this purpose as for instance centrifugal force. In Figures 8 and 9 an apparatus is shown in diagrammatic form by means of which centrifugal force may be used as the separating force.

In this embodiment the tank 21 adapted to contain the liquid bath 22 may be arranged for a rotation as upon ball bearings 23 and arranged to be driven in rotation by any suitable means such as gearing 25 and a motor 26. Rotation of the tank 1 will cause centrifugal force to throw the heavier liquid outwardly to the rim of the tank and the lighter liquid such as oil will move toward the center of the tank. As the centrifugal force acts outwardly the guide track 24 corresponding to the track 4 of Figures 1 and 2 is positioned so as to have its open side facing radially outwardly and is arranged in a helix around the center of rotation having a progressively decreasing radius. An inlet pipe 30 for the heating fluid and a similar inlet pipe 31 for the fluid to be treated enter at the center of the bottom of the tank 21 and lead to the proper point of the track 24 to deliver their fluids thereto. The liquid under treatment travels along the track 24 on the outer surface thereof and the heavier ingredient such as water, upon becoming separated therefrom moves radially outwardly in the bath 22.

Any suitable device for leading the liquid to be treated and also the heating fluid into the tank 21 may be used. A rotary inlet head, indicated generally at 50, is illustrated in section, Figure 3a. This may comprise a suitable casting having a passage 51 to which the inlet pipe 31 for the fluid to be treated is connected, a passage 52 to which the inlet end of the steam pipe 30 is connected, and a center passage 53 to which the outlet end of the steam pipe 30 is connected. Leading to these respective passages are suitable pipes 54, 55, and 56. These may be arranged concentrically and provided with rotary packing devices, as indicated at 57, so as to permit the delivery of the fluid from the stationary pipes 54, 55, and 56 to the respective passages in the head 50, which rotates with the tank 21. The lower ends of these pipes may be connected with a suitable distributing head 58, from which suitable connections, not shown in the drawings, may lead to the sources of supply for the various fluids.

When the device is in operation the refined oil may pass out of the tank by spilling over the rim of an outlet conduit 59, which may also provide a journal for the rotating tank 21. The liquid so discharged may be received in a suitable receptacle 60 to be carried off by a conduit 61. The excess water is discharged by a suitable overflow 62, which may be provided with a vent 63 to break any tendency to syphonic action. A drain plug 64 may be provided for draining the tank.

In the operation of this process with the apparatus illustrated in Figure 1 the liquid under treatment is introduced at the bottom of the tank and preferably has been heated to a high temperature when it is delivered to the bottom of the track 4. The buoyancy of the liquid with respect to that of the bath 2 causes it to travel upwardly along the track 4 as a result of its tendency to float upon the liquid 2. During the upward travel the liquid under treatment continues to be heated as the pipe 8 carries heating fluid the entire length of the track 4. The effect of the heat and the action of the separating force tends to separate the ingredients of the mixture. Immediately upon separation the heavier ingredient such as water tends to settle in the liquid 2. As the region below the track 4 is entirely unobstructed this heavier ingredient may immediately separate and move away from the original liquid. Accordingly the original liquid is free from the separated constituent immediately separation has taken place. As a result of this action the liquid under treatment is continually attaining a more refined condition and subsequent action of the process thereon is impressed upon a progressively more refined ingredient so that toward the end of the process very little if any of the separated ingredient remains in association with the flowing liquid. Accordingly, when this liquid reaches the upper end of the track 4 it is in a highly refined condition and is set free to float upon the top of the bath 2 and the refined liquid collects in the upper part of the tank 1 where it may be drawn off through an outlet 15. When the process is applied to dehydrating oil there is often gas contained in the mixture which gas is also liberated during the operation of the process and collects in the top of the tank 1. An outlet conduit 16 may be provided to remove the collected gas. A water leg 17 to control the level of the liquid 2 may be provided.

It will be seen that this invention provides a method and an apparatus whereby such a mixture of immiscible liquids whether in an emulsified form or otherwise may be effectively treated for separation of its constituents. The process is such that the separating force such as gravity is given a full opportunity to work upon the mixture for an extended period. Furthermore, since the separated ingredient is progressively removed from the liquid under treatment a progressive refinement is accomplished while the process continues to be active upon the refined product. Accordingly a high degree of purity in the final product may be obtained.

While the invention has been described as embodied in a unitary apparatus and process it will be understood, that individual features or sub-combinations thereof may be employed without reference to other features, or the complete combination. It is understood therefore, that the employment of such individual features or sub-combinations is contemplated by this invention and within the scope of the appended claims.

It is further obvious that various changes may be made in the details of construction or procedure within the scope of the appended claims without departing from the spirit of this invention and it is understood therefore, that the invention is not limited to the specific details of structure or procedure shown or described.

Having thus described the invention what is claimed is:

1. In the art of separating immiscible liquids of different densities, the process comprising, passing the mixture slowly and continuously thru a deep liquid bath and guiding the same to move in a fixed path gradually from a greater depth to a lesser depth so as to traverse a major portion of the depth of the bath under the action of a separating force to permit the liquids to separate from the mixture by the action of said force, and moving the liquid of the bath to control the movement of the mixture therethru.

2. An apparatus for treating liquids, comprising, a container adapted to provide a liquid bath, means for delivering the liquid to be treated to the bath, means for guiding the flow of the liquid to be treated thru the bath in a circuitous path adapted to free the guided liquid for action thereon by a separating force, whereby a separated ingredient may immediately move away from the original liquid, and means for moving the bath liquid in order to control the movement therethru of the liquid under treatment.

3. An apparatus for treating liquids, comprising, a container adapted to provide a liquid bath, means for delivering the liquid to be treated to the bath, means for guiding the flow of the liquid to be treated thru the bath in a circuitous path adapted to free the guided liquid for action thereon by a separating force, whereby a separated ingredient may immediately move away from the original liquid, and means for establishing a movement of the bath liquid in a direction contrary to that of the liquid under treatment.

4. An apparatus for treating liquids, comprising, a container adapted to provide a liquid bath, means for delivering the liquid to be treated to the bath, means for guiding the flow of the liquid to be treated thru the bath in a circuitous path adapted to free the guided liquid for action thereon by a separating force, whereby a separated ingredient may immediately move away from the original liquid, and means for establishing a movement of the bath liquid in the same direction as that of the liquid under treatment.

5. An apparatus for treating liquids, comprising, a container adapted to provide a deep liquid bath, means for delivering the liquid to be treated to the bath, means for guiding the flow of the liquid to be treated thru a major portion of the depth of the bath including a track formed to confine the guided liquid in order to retain the same in a definite path but open to permit action on the liquid by a separating force, to cause a separated ingredient immediately to move away from the original liquid, and means for breaking up the smooth flow of the liquid under treatment during its flow.

6. An apparatus for treating liquids, comprising, a container adapted to provide a liquid bath, means for delivering the liquid to be treated to the bath, means for guiding the flow of the liquid to be treated thru the bath in a circuitous path adapted to free the guided liquid for action thereon by a separating force, whereby a separated ingredient may immediately move away from the original liquid, and a fluid jet adapted to set up movement of the bath liquid in order to control the movement therethru of the liquid under treatment.

7. An apparatus for treating liquids, comprising, a container adapted to provide a deep liquid bath, means for delivering the liquid to be treated to the bath, and means for guiding the flow of the liquid to be treated through a major depth of the bath, said guiding means being arranged in a circuitous path in successive tiers with each tier being unmasked by the preceding tiers so as to permit an ingredient separated from the liquid being treated to move away without obstruction.

8. An apparatus for treating liquids, comprising, a container adapted to provide a deep liquid bath, means for delivering the liquid to be treated to the bath, and means for guiding the flow of the liquid to be treated through a major depth of the bath, said guiding means being arranged in a spirally ascending path in successive tiers with each tier unmasking the succeeding one so as to permit an ingredient separated from the liquid being treated to move away without obstruction, and heating means for the liquid being treated extending along and following the path of said guiding means.

9. An apparatus for treating liquids, comprising, a container adapted to provide a deep liquid bath, means for delivering the liquid to be treated to the bath, means for guiding the flow of the liquid to be treated through a major depth of the bath, said guiding means being arranged in a circuitous path in successive tiers with each tier unmasking the succeeding one so as to permit an ingredient separated from the liquid being treated to move away without obstruction, and means for moving the liquid of the bath in order to control the movement therethrough of the liquid under treatment.

10. An apparatus for treating liquids, comprising, a container adapted to provide a deep liquid bath, means for delivering the liquid to be treated to the bath, means for guiding the flow of the liquid to be treated through a major depth of the bath, said guiding means being arranged in a spirally ascending path in successive tiers with each tier unmasking the succeeding one so as to permit an ingredient separated from the liquid being treated to move away without obstruction, and means for rotating the liquid of the bath.

11. In the art of treating liquids, the process comprising, passing the liquid to be treated through a liquid bath, guiding the liquid in a fixed path through the bath, and moving the liquid of the bath in a direction along said path in order to control the movement therethrough of the liquid being treated.

12. In the art of separating immiscible liquids, the process comprising, passing the mixture through a liquid bath along an extended path therein, heating the mixture during such passage, and giving the bath liquid a movement along said path in order to control the speed of movement of the liquid under treatment.

13. In the art of treating liquids, the process comprising, passing the liquid to be treated slowly along an extended path through a liquid bath, and applying heat progressively to the flowing liquid under treatment so as to raise its temperature progressively during such travel in order to promote separation of the ingredients of the liquid under treatment.

14. An apparatus for treating liquids, comprising, a tank providing a deep liquid bath, guiding means in said tank for the liquid to be treated including an inverted trough extending spirally and upwardly in successive convolutions through a major portion of the depth of the bath, means for delivering the liquid to be treated to the bath within said trough, and a heater element extending along said trough in contact therewith to heat the liquid therein.

DONALD D. BURCH.